R. C. McGRATH.
PRESSURE GAGE FOR AIR PUMPS.
APPLICATION FILED JULY 16, 1917.
1,275,282.
Patented Aug. 13, 1918.
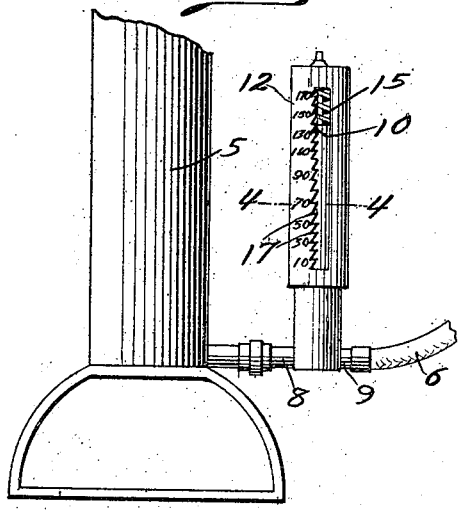
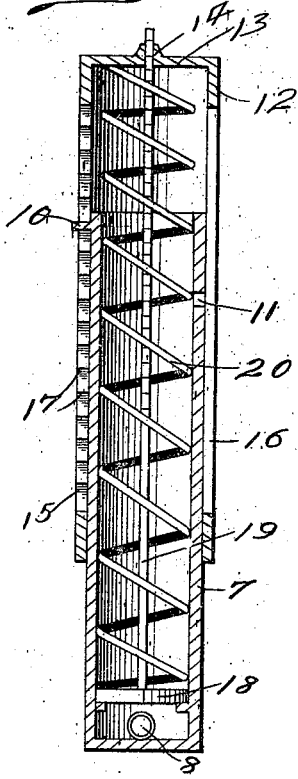
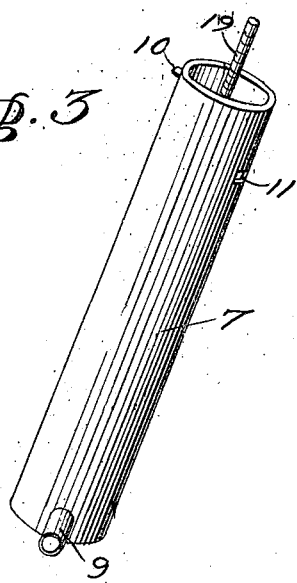
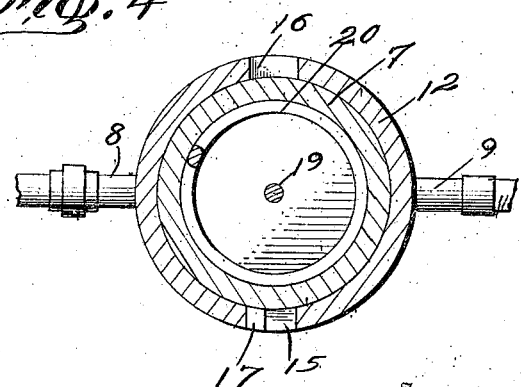
Inventor
R. C. McGrath

UNITED STATES PATENT OFFICE.

RAYMOND C. McGRATH, OF OKEMAH, OKLAHOMA.

PRESSURE-GAGE FOR AIR-PUMPS.

1,275,282.

Specification of Letters Patent.

Patented Aug. 13, 1918.

Application filed July 16, 1917. Serial No. 180,813.

*To all whom it may concern:*

Be it known that I, RAYMOND C. Mc-GRATH, a citizen of the United States, residing at Okemah, in the county of Okfuskee, State of Oklahoma, have invented certain new and useful Improvements in Pressure-Gages for Air-Pumps; and I do hereby declare the following to be a full, clear, and exact description of the invention, such as will enable others skilled in the art to which it appertains to make and use the same.

This invention is an improvement in attachments for air pumps and has particular reference to a pressure gage therefor.

The invention is especially adapted for use in connection with pumps for inflating automobile tires and the like and has for one of its objects to provide a simple and inexpensive construction for readily ascertaining the pressure in a pneumatic tire.

Another object is to provide a gage including improved means for automatically releasing the air passing from the pump to the tire when a predetermined pressure in said tire is reached.

The inventive idea involved is capable of receiving a variety of mechanical expressions, one of which, for the purpose of illustrating the invention, is shown in the accompanying drawing, wherein:—

Figure 1 is a fragmentary side elevation of an air pump of any desired construction showing the pressure gage applied thereto and constructed in accordance with the invention.

Fig. 2 is a vertical longitudinal section through the gage.

Fig. 3 is a perspective view of the inner tubular member of the gage.

Fig. 4 is a transverse section on the line 4—4 of Fig. 1.

In the drawing the numeral 5 indicates an air pump of any desired construction provided with the usual flexible tube 6 extending therefrom.

The gage which comprises the essential feature of the invention is adapted to be interposed between the body of the pump and the tube and preferably includes an inner tubular member 7 having its inner or upper end open and provided at its lower end with oppositely disposed threaded extensions 8 and 9 the former being connected to the pump 5 while the latter has connected to it one end of the tube 6. The member 7 is provided adjacent its upper end with the laterally extending pin 10 and at a point diametrically opposite said pin with a small opening 11 the purpose of which will appear later.

The gage further comprises an outer tubular member 12 having its closed end 13 provided with a small opening 14. The inner end of the outer member or housing 12 is open and said member is adapted to be mounted over the upper end of the member 7 and is preferably provided with diametrically disposed and longitudinally extending slots 15 and 16 the former of which has one of its longitudinal edges provided with a row of teeth 17 that are preferably numbered in order to indicate the different pounds of pressure, any one of these notches being adapted to be engaged by the pin 10 of the member 7.

The member 7 preferably has mounted therein the piston head 18 carried by a rod 19 which extends longitudinally of said member and through the opening 14 in the top or closed end 13 of the member 12 and said rod is also graduated to indicate the pressure of the fluid passing from the pump 5 through the tube 6. Interposed between the closed end 13 of the member 12 and the piston head 18 and surrounding the rod 19 is a coil spring 20 which forces the piston 18 inwardly against the pressure of air. The pressure of air against the piston or valve 18 will force the same upwardly as the pressure of air in the tire increases and as soon as said piston passes the opening 11 the compressed air will automatically escape through said opening and through the slot 16 in the member 12 thus preventing an increase of the pressure in the tire.

In practice, the pin 10 is normally engaged with one of the notches 17 and should it be desired to secure a heavy and predetermined pressure of air in the tire, the member 12 is first slightly rotated to disengage the pin 10 from the notch and then forced downwardly or inwardly toward the tube 6 until the pin 10 is adjacent the notch 17 opposite which the desired amount of pressure is indicated. The member 12 is then rotated to engage the pin 10 with the notch and when so engaged the pin will be held in contact with the lower edge of the notch by the friction induced by the pressure of the spring 20. This adjustment of the member 12 will compress the spring 20 and place the same under a heavy tension which must be overcome by the pressure in the tire in order to raise the piston 18 until the same passes the opening 11. If only a small amount of pressure is required in the tire the pin 10 is engaged with one of the notches 17 adjacent the lower end of the member 12 which will place the spring 20 under less tension and therefore there will be less pressure required to force the piston 18 past the opening 11.

What is claimed is:—

1. A pressure gage comprising an inner tubular member having one end opened and provided adjacent said end with a pin and an opening, the other end of said member having lateral extensions adapted to be connected to an air pump and tube thereof, and a second adjustable tubular member mounted over the first named member and having one end closed and provided with an opening, said second member being also provided with longitudinal slots, one edge of one slot having rack teeth adapted to be engaged by said pin to retain said second member in adjusted positions, a piston operable in the first named tubular member, a piston rod carrying said piston and extending through the opening in the closed end of the second named tubular member, and having a graduated scale readable at said closed end, and a spring interposed between said piston and said closed end of the second tubular member.

2. A pressure gage comprising relatively adjustable and telescoping tubular members, a piston operable under pressure in the inner member and relative to said members, pressure reading means movable with said piston, resilient means interposed between said piston and the outer member and against the tension of which said piston operates, and means for retaining the inner and outer members in relatively adjusted positions to vary the tension of said resilient means.

3. A pressure gage comprising relatively adjustable and telescoping tubular members, a piston operable under pressure in the inner member and relative to said members, pressure reading means movable with said piston, resilient means interposed between said piston and the outer member and against the tension of which said piston operates, teeth formed upon said outer member, and a pin carried by the inner member and engageable with said teeth to retain said members in adjusted positions whereby to vary the tension of said resilient means.

In testimony whereof I affix my signature in the presence of two witnesses.

RAYMOND C. McGRATH.

Witnesses:
V. K. CHOWNING,
C. H. McGRATH.